United States Patent
Matzkovits et al.

(10) Patent No.: US 6,408,530 B1
(45) Date of Patent: Jun. 25, 2002

(54) COORDINATE MEASURING INSTRUMENT OR MACHINING EQUIPMENT

(75) Inventors: Berthold Matzkovits, Gerstetten; Klaus-Dieter Götz, Sersheim, both of (DE)

(73) Assignee: Carl-Zeiss-Stiftung (DE)

( * ) Notice: Subject to any disclaimer, the term of this patent is extended or adjusted under 35 U.S.C. 154(b) by 0 days.

(21) Appl. No.: 09/145,390

(22) Filed: Sep. 1, 1998

(30) Foreign Application Priority Data

Jan. 9, 1997 (DE) ........................................ 197 38 099

(51) Int. Cl.$^7$ ............................ G01B 7/008; G01B 5/008
(52) U.S. Cl. .............................................. 33/503; 33/1 M
(58) Field of Search ........................ 33/503, 1 M, 556, 33/559, 557, 558, 560, 561, 572

(56) References Cited

U.S. PATENT DOCUMENTS

| | | | | |
|---|---|---|---|---|
| 3,069,778 A | * | 12/1962 | Schiler | 33/503 |
| 4,133,112 A | * | 1/1979 | Matthiessen | 33/503 |
| 4,593,469 A | * | 6/1986 | Shoup, II | 33/503 |
| 4,976,043 A | | 12/1990 | Bieg | |
| 5,610,846 A | | 3/1997 | Trapet et al. | |
| 5,649,368 A | | 7/1997 | Herzog et al. | |
| 5,758,429 A | * | 6/1998 | Farzan et al. | 33/503 |
| 5,867,916 A | * | 2/1999 | Matzkovits | 33/503 |
| 5,870,834 A | * | 2/1999 | Sheldon | 33/503 |

FOREIGN PATENT DOCUMENTS

| | | | | |
|---|---|---|---|---|
| DE | 23 63 232 | | 12/1973 | |
| DE | 27151750 A1 | * | 10/1978 | 33/503 |
| DE | 32 05 894 A1 | | 2/1982 | |
| DE | 38 23 042 A1 | | 7/1988 | |
| DE | 40 26 990 A1 | | 2/1992 | G01D/11/02 |
| DE | 4132333 | * | 4/1992 | 33/503 |
| JP | 60-181601 | | 9/1985 | |
| JP | 07190741 | | 7/1995 | |
| JP | 08247755 | | 9/1996 | |

* cited by examiner

Primary Examiner—Diego Gutierrez

(57) ABSTRACT

A coordinate measuring instrument or machining equipment has a component that is mounted at its one end, movably on two guides, by a component foot. In order to be able to compensate rotation errors of the component, the component foot is arranged such that the component is turned in a plane that is orthogonal to the direction of motion of the component foot when the distance between the guides is changed.

7 Claims, 3 Drawing Sheets

COORDINATE MEASURING INSTRUMENT OR MACHINING EQUIPMENT

BACKGROUND OF THE INVENTION

1. Field of the Invention

The invention relates to a coordinate measuring instrument or a machining equipment, and more particularly to such an instrument or equipment with a component that is mounted movably on two guides at its one end by means of a component foot.

2. Discussion of Relevant Art

A coordinate measuring instrument of this kind is known, for example, from German Patent DE 40 26 990 A1. This concerns a so-called column measuring instrument, in which the said component is a vertically aligned column. There is mounted on the column a horizontally movable measuring arm that is additionally mounted on a cross-slide that is displaceable vertically on the column. A feeler pin attached to the end of the measuring arm can thus be displaced in two mutually perpendicular coordinate measuring directions. In order to be able to move the feeler pin in the third coordinate direction perpendicular to the other coordinate measuring directions, a column foot is attached to the column and is movably guided on the end surface of a measuring table on two spaced-apart guides.

Since the guides cannot be attached to the end of the measuring table exactly parallel within the range of production accuracies, rotation errors of the column thus arise and result in a variation of the vertical alignment of the column in dependence on the alignment of the guides. It was therefore already proposed in German Patent DE 40 26 990 A1 to provide variably adjustable elements by means of which the distance of the guides from the end of the measuring plate can be altered, in order thereby to adjust the guides so that the guides are aligned nearly parallel and the rotation errors no longer arise.

An adjustment of this kind, in which the distance of the guides from the measuring plate has to be set, is however very expensive in time and thus in cost.

SUMMARY OF THE INVENTION

The present invention therefore has as its object to propose a coordinate measuring instrument or a machining equipment, with which the rotation errors can be corrected in a simple manner. The object is attained according to the invention in that the component foot is arranged so that the component turns in a plane which lies orthogonally to the direction of motion when the distance between the guides is altered.

The particular advantage of the coordinate measuring instrument according to the invention is that only the distance between the guides has to be correspondingly set in order to compensate for the rotation error. This is considerably simpler than adjusting the distance of the guides from the measuring plate, since the adjustment can now take place transversely of the direction of attachment to the measuring plate. Thus the two guides can firstly be fastened precisely and parallel to each other, and thereafter one of the two guides can be adjusted so that the distance of the guides is correspondingly set.

In order to obtain this functionality, the component foot has at least one extension arm that is mounted movably relative to the component and is supported on a first of the two guides.

In a particularly preferred embodiment, the extension arm is connected to the component foot by means of a joint, and in fact such that when the distance between the guides is reduced, forces arise that lead to a rotation of the component concerned. Ball joints are candidates as joints here as well as the usual hinges.

The rotation of the component or of the component foot takes place around a joint in the region of the second guide. This is possible, for example, when the component foot has, at a distance from the second guide, at least one corresponding joint by means of which the column is rotatably mounted on the second guide. However, this is also possible when, as described hereinbelow in further detail, the component can itself be directly rotated around the guide, which is possible, for example, when the guide includes a rail and at least one revolving ball shoe, movably mounted on the rail since revolving ball shoes can be rotated in a small angle range about the rails.

Also the extension arm must be additionally mounted in the region of the first guide, for rotational movement. This can take place, as already stated above, either by the extension arm being rotatably guided directly on the rail, or by the extension arm having an additional joint which is provided in the region of the guide.

However, it is not imperatively necessary for the extension arm to be rotatably connected to the component foot, as is the case in the first embodiment example described above. In another variant, not shown here in more detail, it is only necessary for the component to be rotatably mounted on the said second guide. The extension arm can here be mounted completely rigidly on the first guide and can cooperate, by means of a correspondingly curved running surface, with an obliquely formed surface of the component, such that when the distance between the two guides is reduced, the curved surface is pushed like a wedge under the curved, tapered surface of the component and the component is thereby turned. In order to be able to rotate the component in the other direction also, the curved surface and the tapered surface are pulled together, for example by means of mechanical clamping, or by means of magnets.

Any guides, such as for example air bearing guides, slideways, or rolling guides can of course be used as the guides. As already stated hereinabove, the guides however include, in a particularly advantageous embodiment, revolving ball shoes and rails on which the revolving ball shoes are guided. These have the particular advantage that the revolving ball shoes are permitted a rotation through a small angle of rotation about the longitudinal axis of the rail, so that in particular a rotary joint on the second guide for a rotation of the component can be dispensed with. The alignment of the two guides is completely unimportant here. For example, the guides can be attached to the end of a measuring table, as already described in connection with DE 40 26 990 A1. They can of course just as well be fastened to the upper side of the measuring table, to a wall, to the floor of the space, to a column, etc.

Very different variants are also conceivable as the component. For example, the cross slide shown in DE 40 26 990 A1 and provided for carrying the measuring arm could just as well be guided on the column of the column measuring instrument by means of the described construction. Also, the measuring arm could be guided on the cross slide, in which case the guide rails would be fastened to the measuring arm.

BRIEF DESCRIPTION OF THE DRAWINGS

Further advantages and developments of the invention will become apparent in the following description of the invention, taken together with the accompanying drawings, in which.

DETAILED DESCRIPTION OF PREFERRED EMBODIMENTS

Figure 1:
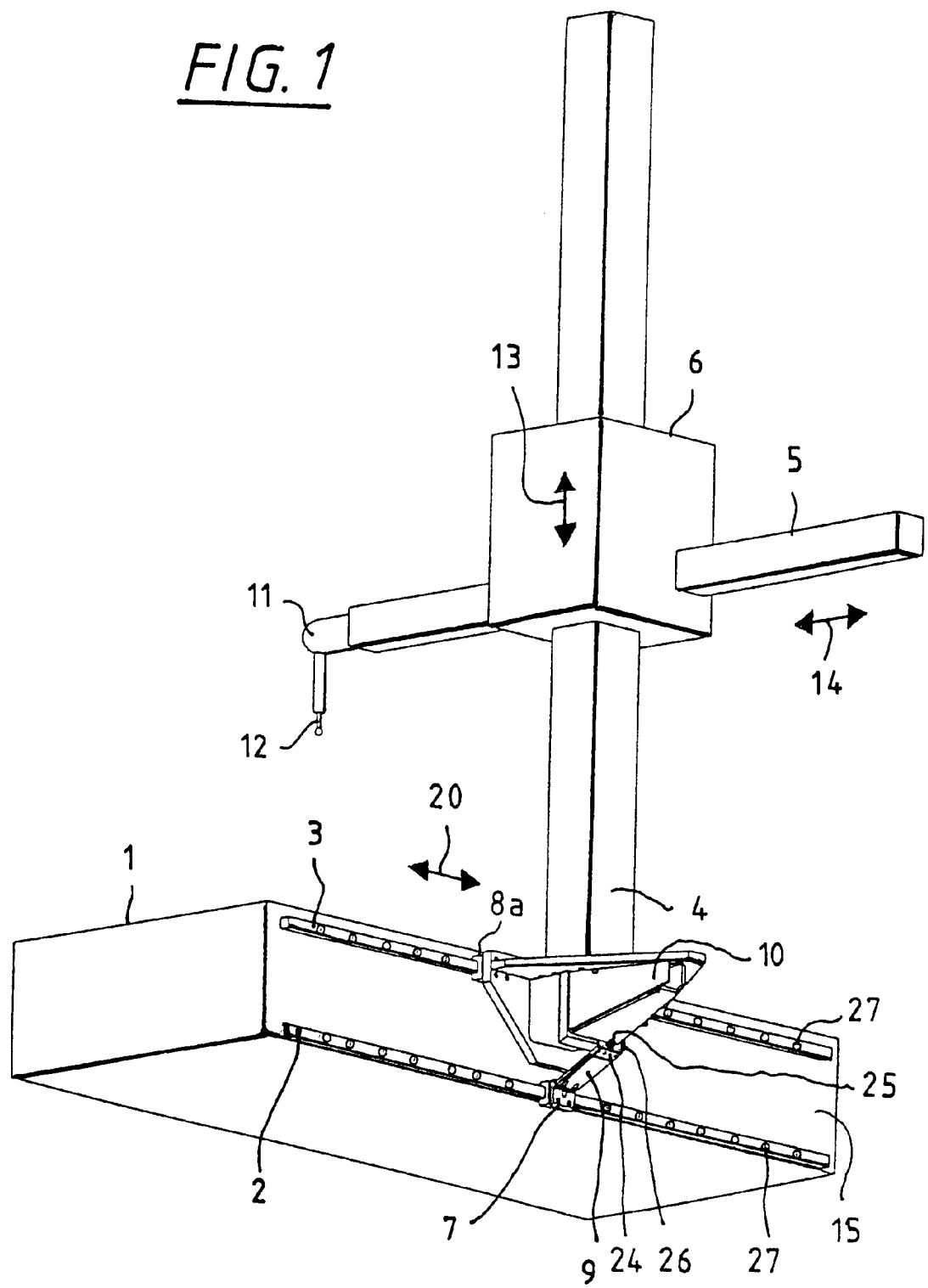
FIG. 1 shows a perspective view of a coordinate measuring instrument according to the invention.

FIG. 1 shows a coordinate measuring instrument according to the invention, in a perspective view. The coordinate measuring instrument has a sensing head (11), to which a contacting measuring feeler pin (12) is attached, with which a workpiece to be measured (not shown in more detail here) can be sensed and thus measured. In order to be able to measure spatially the workpiece to be measured, the sensing head (11) is attached to a measuring arm (5) which in its turn is displaceable on a cross slide (6) in the direction of the arrow (14). For this purpose, the measuring arm (5) is mounted by means of air bearings or roller bearings in the cross slide (6) and is displaced by means of a friction wheel drive in the direction of the arrow (14). The exact position of the measuring arm (5) is established in that a glass scale, not described here in further detail, is attached to the measuring arm (5) and is read out by a corresponding optical sensing head.

The cross slide (6) in its turn is likewise mounted by means of corresponding bearings on a column (component) (4) and is movable in the direction of the arrow (13) by means of corresponding bearings, the cross slide being driven here by means of corresponding friction wheel drives. The exact height of the cross slide (6) is sensed in a completely analogous manner by means of a glass scale attached to the column and a cooperating optical sensing head arranged in the cross slide (6).

In order now to be able to also move the sensing head in the third coordinate measuring direction, which is perpendicular to the coordinate measuring directions in the direction of the arrows (13) and (14), the column (4), which here by way of example represents the component according to the invention, is mounted movably on guides (30, 31) in the direction of the arrow (20) by means of a column foot (10), which here corresponds to the component foot; the rails (2, 3) of the guides (30, 31) are attached to an end of the measuring table (1). The corresponding glass scale, with an optical sensing head for determining the position, and the friction wheel drive, are not shown here for the sake of simplicity.

Figure 2:
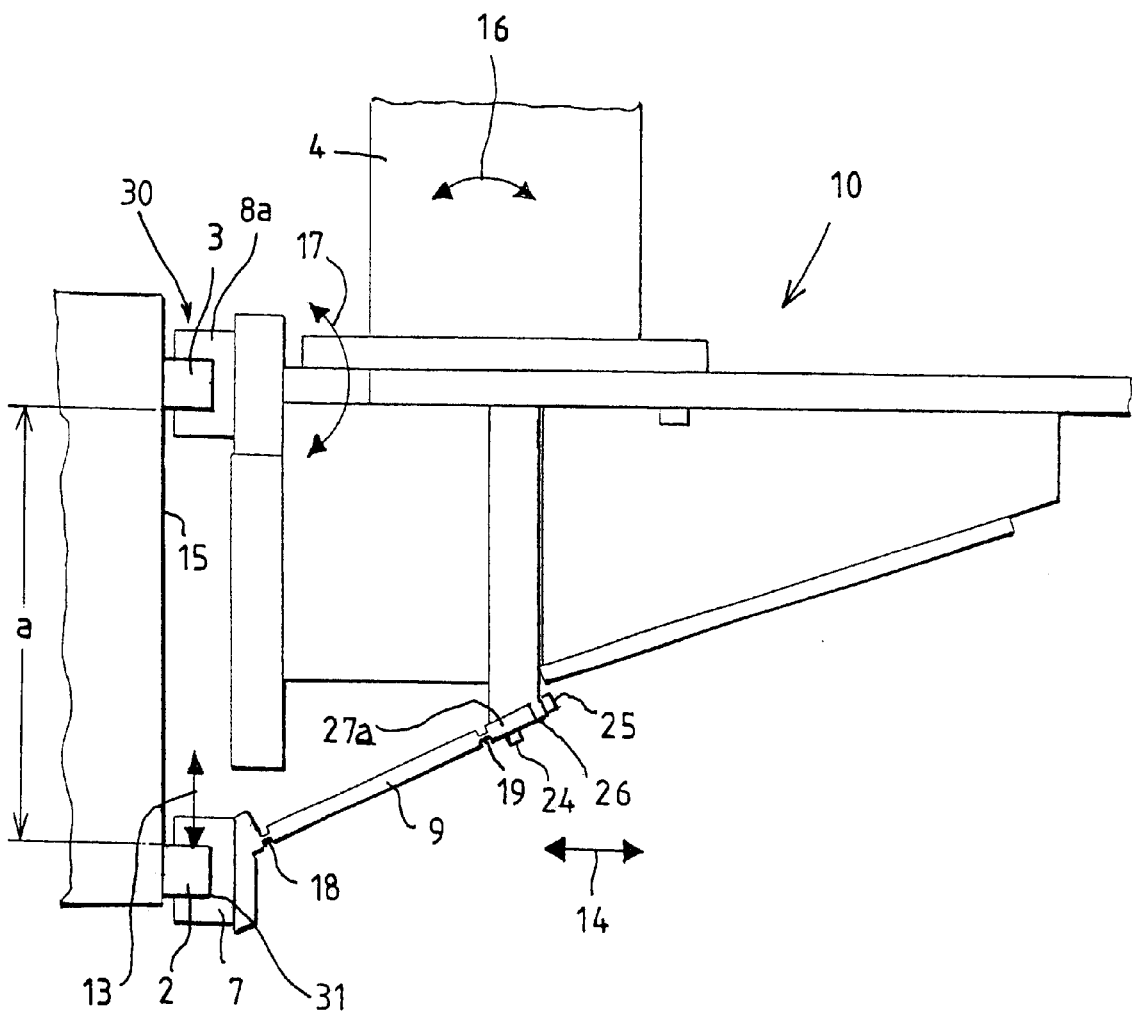
FIG. 2 shows a side view of a detail of the coordinate measuring instrument concerned.

The manner of operation of the column foot (10) will now be described with reference to FIG. 2, in which the column foot according to the invention is described.

As described hereinabove, the column foot (10) is embodied such that it runs on the two guides (30, 31), and the guides consist of rails (2, 3) and revolving ball shoes (7, 8a, 8b) which are guided on the rails (2, 3). Such guides are obtainable from the Deutsche Star company of the Mannesmann Rexroth Group, under the name of "Kugel-Schienenführungen".

As already stated hereinabove, for the column measuring instruments of the prior art, in the case that the rails (2, 3) were not aligned completely parallel in the direction of the arrow (14), for example because an end face (15) of the measuring table is uneven, or the rails (2) or (3) are unevenly made, the column (4) rotates during the movement along the rails (2, 3) according to the arrow (16).

This has the result that the rails (2, 3) had to be corrected in the direction of the arrow (14), which took place only by means of spacers as a relatively limited adjustment which altered the distance of the rails (2, 3) from the measuring table (1).

An adjustment can now take place in a considerably simpler manner according to the invention, in that an extension arm (9) is provided on the guide (31) and is rotatably connected to the remaining column foot (10) by means of a leaf spring joint (19) such that on altering the distance (a) of the guides (30, 31), the column (4) is rotated in a plane lying orthogonally to the direction of proper motion (arrow 20), so that the alignment of the column changes. In addition, the extension arm (9) is further connected to the revolving ball shoe (7) via a second leaf spring joint (18).

The following effect occurs thereby. If the rail (2) is displaced in the direction of the arrow (13), so that the distance (a) changes with respect to the rail (3), and thus the distance (a) between the guides (30, 31) changes, the revolving ball shoe (7) is thereby raised or lowered relative to the revolving ball shoes (8a, 8b). Since the revolving ball shoe (7) is rotatably connected to the remainder of the column foot (10), and in particular to the revolving ball shoes (8a), a torque around the guide (3, 8a, 8b) results because of this. The whole column foot (10) is thereby rotated, corresponding to the arrow (17), around the revolving ball shoes (8a), which are mounted such that they have a low resistance to torsion. The rotation around the revolving ball shoes (8a) now simultaneously has the consequence that the column is also rotated corresponding to the arrow (16).

If now errors of parallelism occur in the rails (2, 3), so that in prior art column measuring instruments the column (4) would have been rotated corresponding to the arrow (16), this can now be easily compensated for, in that the distance (a) between the rails (2, 3) is adjusted so that the column (4) obtains the same vertical alignment at each point on the rails (2, 3).

The corresponding adjustment can take place as explained hereinbelow.

Figure 3:
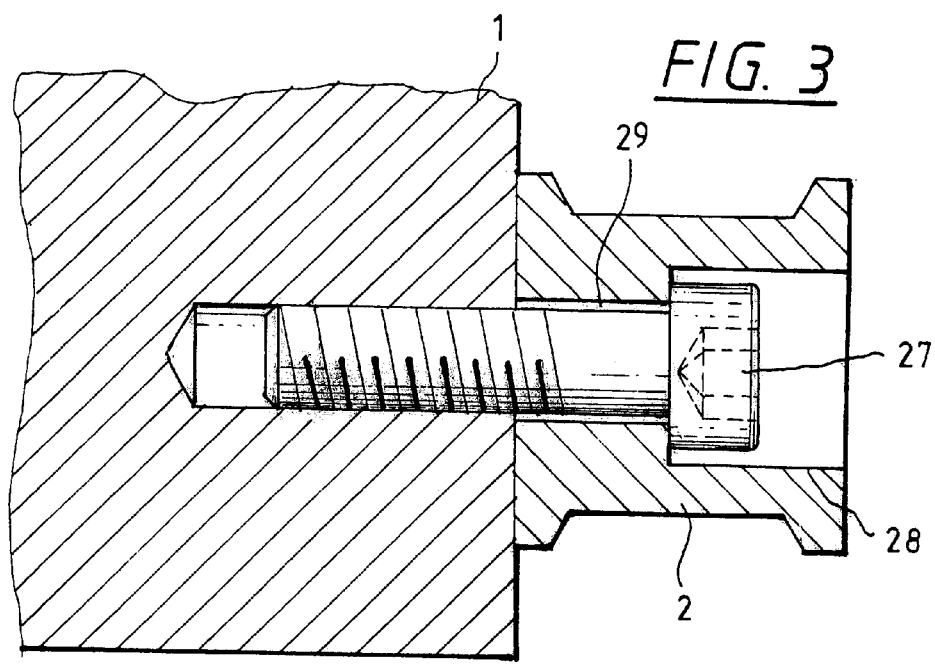
FIG. 3 shows a detail of the measuring table (1) and the rail (2) attached thereto, in section.

Thus in a first step the rails are fastened and aligned, as straight and parallel as possible, on the measuring table (1) of the coordinate measuring instrument by means of a series of holding elements, in this case hexagonal socket head cap screws (27). The distance (a) between the rails (2, 3) should be such that the column (4) is aligned exactly vertically with the given geometry and the ideal alignment of the rails (2, 3). To fasten the rails (2, 3) the rails (2, 3) have holes (28, 29) whose diameter is greater than the corresponding external diameter of the thread and of the screw head of the hexagonal socket head cap screw (27), so that the rails (2, 3) can be displaced, and thus aligned, relative to the hexagonal socket head cap screws (27) when the hexagonal socket head cap screws (27) are loosened, and can be tightened after alignment. FIG. 3 is provided to illustrate the holding principle; there are shown in section in it, as an example, a portion of the measuring table (1) and the rail (2) fastened by one of the hexagonal socket head cap screws (27). The rail (2) in this FIG. 3 is shown, as an approximation, in a profile which is typical for the ball rail guides used, and which is omitted in the other Figures for the sake of clarity.

In the next step, the rotation of the column (4) about the direction of movement is measured at different places over the whole length of travel. The rotation is determined here by means of an inclination water level balance.

In the succeeding step, distance correction values are calculated from the rotation measurements, to give the amounts by which the distance (a) between the rails (2, 3) has to be corrected. The calculation can be effected easily here, since the rotation angle change of the column (4) is approximately proportional to the change of the distance (a). The constant of proportionality here can be determined either analytically from the geometrical relationships of the column foot (10), or empirically.

In a last step, the hexagonal socket head cap screws of the rail (2) are loosened and the rail (2) is brought by means of a lifting device into the corresponding distance from the rail (3), and the said hexagonal socket head cap screws are tightened firmly again, so that the prescribed distance (a) to the rail (3) is present at the hexagonal socket head cap screw (27) concerned.

As lifting devices, those are conceivable which work on the principle of a jack and which support the rail (2) with respect to the floor.

Figure 4:
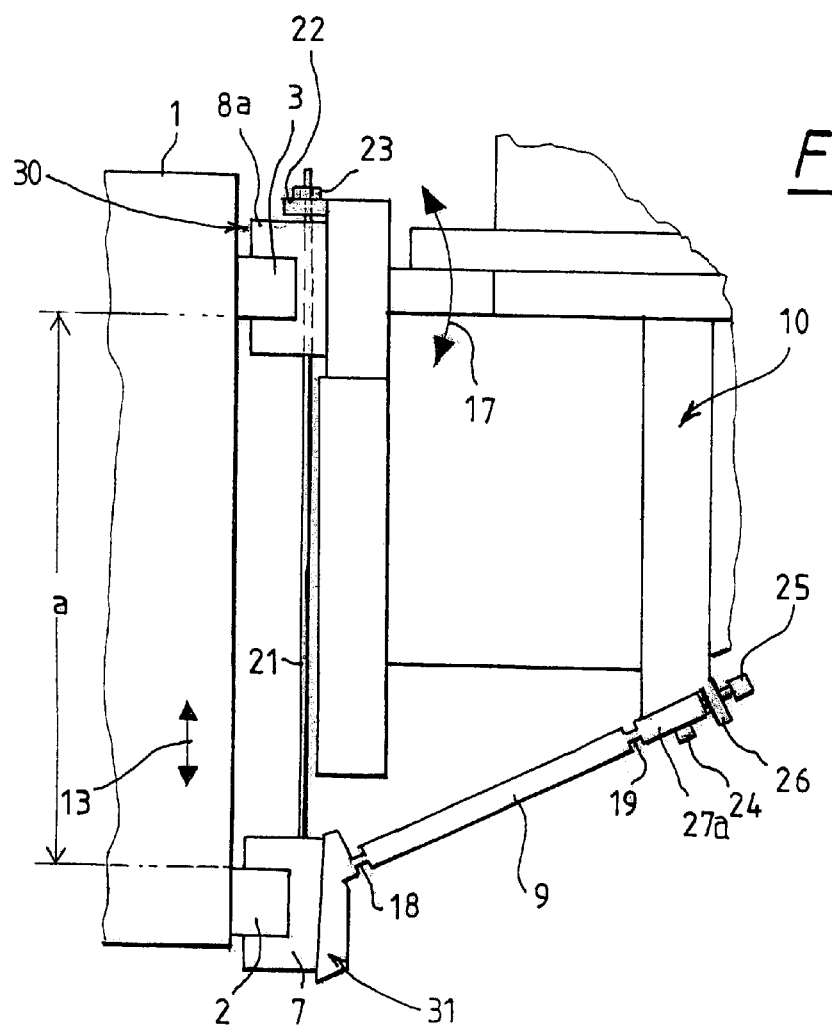
FIG. 4 shows a side view of a detail of the coordinate measuring instrument concerned, in a developed form.

The lifting device can however also be an integral part of the component foot (10), as shown in FIG. 4 by way of example. For this purpose, for example, a threaded rod (21) can be attached to the revolving ball shoe (7); in the upper region of the column foot (10) the threaded rod is guided through a hole of a plate (22) fastened to the column foot (10). A nut (23) is here screwed onto the threaded rod on the upper side of the said plate (22), so that be actuation of the nut (23), the revolving ball shoe (7) is raised or lowered in the direction of the arrow (13) and thus with respect to the column (4).

The distance (a) is determined here by means of a special slide guided on the rail (3) and not shown here in detail, on which a micrometer is disposed which measures the respective distance to the rail (2) at the desired point.

In addition, adjusting means may also be provided on the said component foot or column foot (10), by means of which the fastening of the extension arm (9) to the column foot (10) can be adjusted, in order thereby to be able to additionally adjust the alignment of the column (4). The adjustment means here include hexagonal socket head cap screws (24) which are screwed through the end (27a) of the extension arm (9) on the column (4) side, in fact completely analogously to that already explained in connection with FIG. 3, in that the holes in the end (27a) are larger than the external diameter of the thread and screw heads of the hexagonal socket head cap screws (24). With the screws (24) loosened, the end (27a) can thus be moved with respect to the column foot (10).

Furthermore the adjustment means include a plate (26) in which a thread is provided into which a screw (25) is screwed. When the screws (24) are loosened, the end of the extension arm can now be displaced with respect to the component foot (10) by turning the screw (25), in order hereby to adjust the alignment of the column (4).

As already stated hereinabove, the guides (30, 31) can be fastened to various different components and can be differently aligned, e.g. on a measuring table, a wall, a floor, a column, etc. They can of course also be fastened to differently aligned surfaces. For example, it is conceivable to fasten the guide (30) to the upper side of the measuring table (1) and the guide (31) to the end of the measuring table (1). For this case, the column foot (10) and also the extension arm (9) would of course have to be correspondingly modified.

We claim:

1. An improved co-ordinate measuring instrument having a sensing head to measure a work piece; said sensing head being attached to a measuring arm that in turn is moveably guided on a cross slide mounted on a measuring table of the coordinate measuring instrument in a linear direction, the improvement comprising said cross slide being moveably guided on a component mounted movable on two guides, attached parallel to one another on the measuring table said component being mounted at one end on a component foot for movement on said two guides, wherein said component foot comprises an extension arm that is mounted movably with respect to said component by at least one joint and is supported on a first guide of said two guides, and wherein said component foot is rotatably mounted on a second guide of said two guides, such that on altering the distance between said two guides said component is rotated in a plane lying orthogonal to the direction of motion of said component on said two guides, so that alignment of said component changes.

2. The improved coordinate measuring instrument according to claim 1, wherein said extension arm is mounted rotatably with respect to said first guide of said two guides and with respect to said component foot, each with a respective joint.

3. The improved coordinate measuring instrument according to claim 2, wherein said respective joints comprise leaf spring joints.

4. The improved coordinate measuring instrument according to claim 1, wherein said two guides include revolving ball shoes.

5. The improved coordinate measuring instrument according to claim 1, wherein said coordinate measuring instrument is a column measuring instrument and said component comprises a column of said column measuring instrument.

6. The improved coordinate measuring instrument according to claim 1, further comprising a lifting device arranged on said component foot that lifts an end of said extension arm supported on said first of said two guides with respect to said component or said component foot.

7. The improved coordinate measuring instrument according to claim 1, further comprising an adjuster on said component foot that adjusts the fastening of said extension arm to said component or said component foot.

* * * * *